(12) United States Patent
Strothmann

(10) Patent No.: US 12,433,190 B2
(45) Date of Patent: Oct. 7, 2025

(54) METHOD FOR OPERATING A MACHINE FOR HARVESTING AND/OR SEPARATING ROOT CROPS, ASSOCIATED MACHINE AND ASSOCIATED COMPUTER PROGRAM PRODUCT

(71) Applicant: Grimme Landmaschinenfabrik GmbH & Co. KG, Damme (DE)

(72) Inventor: Wolfram Strothmann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 630 days.

(21) Appl. No.: 17/904,271

(22) PCT Filed: Feb. 9, 2021

(86) PCT No.: PCT/EP2021/053070
§ 371 (c)(1),
(2) Date: Aug. 15, 2022

(87) PCT Pub. No.: WO2021/160607
PCT Pub. Date: Aug. 19, 2021

(65) Prior Publication Data
US 2023/0080863 A1 Mar. 16, 2023

(30) Foreign Application Priority Data
Feb. 14, 2020 (DE) .......................... 102020103941.7

(51) Int. Cl.
*A01D 33/04* (2006.01)
*A01D 33/08* (2006.01)
*G06V 20/68* (2022.01)

(52) U.S. Cl.
CPC ............. *A01D 33/04* (2013.01); *A01D 33/08* (2013.01); *G06V 20/68* (2022.01)

(58) Field of Classification Search
CPC .......... A01D 33/04; A01D 33/08; G06V 20/68
See application file for complete search history.

(56) References Cited

U.S. PATENT DOCUMENTS

| 3,435,950 A | 4/1969 | Lew |
| 4,324,336 A | 4/1982 | Sandbank |
| (Continued) | | |

FOREIGN PATENT DOCUMENTS

| BE | 1003540 A3 | 4/1992 |
| CN | 104011736 A | 8/2014 |
| (Continued) | | |

OTHER PUBLICATIONS

Hofsstee, J.W. et al., "Aardappelopbrengst meten met beeldverwerking kan", Landbouwmechanisatie, Apr. 2003 (Apr. 2003), Issue No. 2003.

(Continued)

*Primary Examiner* — Casey L Kretzer
(74) *Attorney, Agent, or Firm* — Husch Blackwell LLP

(57) ABSTRACT

A method is provided for operating a machine for harvesting root crops and/or for separating root crops from further additionally conveyed material that includes at least soil in the form of loose earth and/or soil aggregates, and also, if applicable, leaves and/or stones. By means of at least one electromagnetic, in particular optical, or acoustic image capturing unit, at least one inspection image is captured of at least one portion of the material, moved relative to a machine frame of the machine by at least one transport element, in particular a screen belt. On the basis of at least one inspection data set generated using the inspection image and/or formed by this image, an evaluation device generates an adjustment signal for adjusting at least one operating parameter of the transport element and/or a further transport element of the machine. At least one feature for describing the ability to be screened of the additionally conveyed soil (Continued)

is determined by the evaluation device and is used for adjusting the operating parameter. The invention also relates to a machine for harvesting root crops and a computer program product.

16 Claims, 11 Drawing Sheets

(56) References Cited

U.S. PATENT DOCUMENTS

| | | | |
|---|---|---|---|
| 5,653,633 | A | 8/1997 | Kalverkamp et al. |
| 6,119,442 | A | 9/2000 | Hale |
| 2007/0056258 | A1 | 3/2007 | Behnke |
| 2008/0027888 | A1 | 1/2008 | Azzam et al. |
| 2011/0112684 | A1 | 5/2011 | Pellenc |
| 2013/0159671 | A1 | 6/2013 | Brown et al. |
| 2014/0050364 | A1 | 2/2014 | Brueckner et al. |
| 2017/0013773 | A1 | 1/2017 | Kirk et al. |
| 2017/0235471 | A1 | 8/2017 | Scholer et al. |
| 2018/0042176 | A1 | 2/2018 | Obropta et al. |
| 2018/0047177 | A1 | 2/2018 | Obropta et al. |

FOREIGN PATENT DOCUMENTS

| | | |
|---|---|---|
| CN | 104062298 A | 9/2014 |
| CN | 105684627 A | 6/2016 |
| CN | 110602943 A | 12/2019 |
| CN | 112970032 A | 6/2021 |
| CN | 112970033 A | 6/2021 |
| DE | 213115 A1 | 9/1984 |
| DE | 19804147 A1 | 8/1998 |
| DE | 102015224175 B3 | 4/2017 |
| EA | 202292299 A1 | 10/2022 |
| EP | 699379 A2 | 3/1996 |
| EP | 1763988 A1 | 3/2007 |
| JP | S60-122083 A | 6/1985 |
| JP | 2011240257 A | 12/2011 |
| JP | 2015529154 A | 10/2015 |
| JP | 2018001115 A | 1/2018 |
| SU | 950227 A1 | 8/1982 |
| WO | 2018008041 A2 | 1/2018 |
| WO | 2020094654 A1 | 5/2020 |
| WO | 2020094655 A1 | 5/2020 |

OTHER PUBLICATIONS

Third Party Observation issued Jun. 2, 2022.

Morquin, D. et al., "An integrated neural network-based vision system for automated separation of clods from agricultural produce", Engineering Applications of Artificial Intelligence 16, pp. 45-55, Feb. 15, 2003 [Feb. 15, 2003].

Rady, Rapid and/or nondestructive quality evaluation methods for potatoes: A review, Computers and Electronics in Agriculture, 2015, pp. 31-48, vol. 117.

Office Action and Search Report issued in corresponding CN Application No. 202180014742.8 on Mar. 22, 2024.

METHOD FOR OPERATING A MACHINE FOR HARVESTING AND/OR SEPARATING ROOT CROPS, ASSOCIATED MACHINE AND ASSOCIATED COMPUTER PROGRAM PRODUCT

CROSS REFERENCE

This application claims priority to PCT Application No. PCT/EP2021/053070, filed Feb. 9, 2021, which itself claims priority to German Patent Application No. 10 2020 103941.7, filed Feb. 14, 2020, the entireties of both of which are hereby incorporated by reference.

FIELD OF THE INVENTION

The invention relates to a method for operating a machine for harvesting root crops and/or for separating root crops from further additionally conveyed material that includes at least soil in the form of loose earth and/or soil aggregates, and also, if applicable, leaves and/or stones. The object of the method is also to capture at least one inspection image of at least one portion of the material that is moved relative to a machine frame of the machine by at least one transport element, in particular a screening band, by means of at least one electromagnetic, in particular optical, or acoustic image acquisition unit. Furthermore, an operating parameter of the machine is set using an evaluation device.

BACKGROUND OF THE INVENTION

In US 2017/013773 A1, for example, an optical or acoustic sensor is used to measure the texture of the soil and/or its abradability, with the aim of adjusting the depth of the excavation elements depending on the soil information. This is based on the insight that, with the same settings, the working depth of the excavation elements decreases following a transition from soft to hard soil, which can be accompanied by loss of root crops. Adjusting the excavation depth of the harvesting machine depending on the soil conditions prior to harvesting the crops will therefore reduce crop losses and result in better yields.

BRIEF SUMMARY OF THE INVENTION

The object of the present invention is to use soil information for the treatment of the material in the machine.

According to the invention, in a method for operating a machine for harvesting and/or separating root crops from further, additionally conveyed material that includes at least soil in the form of loose earth and/or soil aggregates and also, if applicable, leaves and/or stones, by means of at least one electromagnetic, in particular optical, or acoustic image acquisition unit at least one inspection image is first captured of at least a portion of the material moved relative to a machine frame of the machine by at least one transport element, in particular a screening band, and, on the basis of at least one inspection data set generated using the inspection image and/or formed by this image, an evaluation device generates an adjustment signal for adjusting at least one operating parameter of the transport element and/or a further transport element of the machine, wherein at least one feature is determined by the evaluation device for describing the capability of the soil being additionally transported to be screened and used to adjust the operating parameter.

The adjustment signal changes the effect of one or more of actuating or drive devices of the transport element to vary the screening of the soil. The invention therefore relates to transport elements in the form of separators provided for sifting soil, in particular, to screening bands, hedgehog bands, and/or roller arrangements.

In particular, the image acquisition unit with its sensor is aligned with a transport element that is formed as a screening band, which as a first or second screening band transports the material through the machine after it has been collected. In this design of the method according to the invention, the soil is thereby analyzed very soon after collection, in particular in an analysis in a first half or a first third of the screening band, in order to be able to react very quickly to changes in soil condition by adjusting the operating parameter and thus to adjust immediately or even preventively at least a portion, in particular a predominant portion, of a screening conveyor comprising one or preferably more screening bands. The adjustment of the operating parameter is preferably made within a time window of a maximum of 1 minute, preferably a maximum of 30 seconds, after acquiring the inspection image, i.e. the evaluation device is designed in such a way that it has completed the evaluation of the inspection image within this time. Furthermore, the adjustment of the operating parameter has at least been initiated or carried out within this time.

Soil aggregates are considered to be aggregates made of soil or earth constituents with a minimum diameter of not less than 5 mm. In the case of non-spherical aggregates, for example, an equivalent diameter can be assumed. A soil aggregate always consists of a plurality of interconnected grains, which include in particular sand, silt, and/or clay. Loose soils are grain fragments with grain sizes of up to 2 mm and, according to the above definition, aggregated grains with a diameter of less than 5 mm.

Also, the optical or acoustic image acquisition unit or an additional such image acquisition unit with its sensor may be aligned onto a region behind a transport element in order to be able to respond to any remaining soil aggregates. For example, if too few smaller aggregates and too many large aggregates are detected, the screening width can be reduced and, for example, the knocking capacity of a knocker acting on the screening band can be increased to reduce the size of large aggregates.

Preferably, in particular by means of a classification method, components of the material present in the inspection image are determined that comprise loose earth and/or soil aggregates, in particular clods, wherein clods are generally regarded as larger aggregates, i.e. as chunks of earth with a diameter above 5 cm. The term "plaque" is sometimes used as a synonym for elongated clods. By means of such a classification, for example by evaluating the color values of the inspection data set, individual components of the transported material under analysis can be identified. For example, for the examination of the soil aggregates, it is possible simply to rely on an inspection image or section of it that consists exclusively, or at least predominantly, (see below) of soil aggregates.

Preferably, the feature used to describe the screening capability comprises one or more values which describe the size, shape, moisture content, strength, or color of one or more soil aggregates and/or one or more in particular statistical distributions of the size, shape, strength, or color of a plurality of soil aggregates. For example, such a value can be used to assign a size class for all soil aggregates present in an inspection image or inspection data set, so that in the interests of better automated processing no individual soil aggregates are required.

Preferably, the size of the examined soil aggregates, in particular clods, is used. For example, this could be diameters, equivalent diameters, projected surface areas, or volumes. In a further alternative or supplementary design of the invention, shape or color parameters of the aggregates can be extracted, since the color and shape change accordingly with different soil types and fluctuating soil moisture levels, which are the main factors influencing the screening capability. The same applies to the strength, which can be derived from color, shape, and size. For example, the breaking load can be used as a measure of the strength of a soil aggregate.

In a further alternative or supplementary design of the method according to the invention, one or more in particular statistically-aggregating features or distributions calculated over the values for size, color, strength and/or shape of a plurality of, in particular different, soil aggregates can serve as screening capability features.

Such statistical features which aggregate the distribution of a plurality of individual features may be, for example, mean values, standard deviations/variances, median, percentiles, or 1st, 2nd, kth-order moments.

According to a refinement of the invention, the sizes, shapes, or colors are classified into a predefined number of classes, preferably five, with values monotonically increasing or decreasing from the first class to the last class. The average membership or the most probable class of a plurality of soil aggregates considered in an inspection data set then serve as a feature for describing the screening capability. If, for example, a small aggregate size class is found on average, e.g. because the soil being cleared is mostly dry and sandy, the screening performance can be reduced, for example by adjusting a small screening bar or roller spacing.

Advantageously, in a further design of the method according to the invention, screening capability features obtained in a series of consecutive evaluation cycles are temporally filtered or offset against one another before the operating parameters or their adjustment are determined on the basis of these. Low-pass filters or sliding mean values are particularly suitable here to smooth out possible outliers.

The inspection dataset is formed either by the inspection image or a portion of it. It can also be a dataset resulting from a processing and/or analysis of the inspection image or a portion of it. Furthermore, the inspection data set can contain the inspection image itself, a processed inspection image, and/or a data set derived from an analysis of the inspection image. The same applies to the respective parts of the inspection image, the processed inspection image and a data set created on the basis of an analysis of at least a portion of the inspection image.

The at least one feature obtained from the inspection data set for determining the screening capability will be used to adjust the operating parameter of the or one of the transport elements, in particular screening bands, provided for sifting the earth. After a qualitative determination of the components present in the harvested crop, e.g. by means of color values as described in DE 102018127844 A1, a quantitative determination of the screening capability feature or features is then performed. The transport element can be adjusted by means of the method according to the invention in such a way that a desired quantity of soil aggregates, e.g. clods or clod sizes, is available on a region of the conveyor section that is present after the collector, and thus the crop material to be exploited in the form of root crops is optimally separated depending on the desired soil aggregates, in particular soil aggregate sizes, or at the same time protected by the apparatus during transport. By means of the method according to the invention, the throughput of the operated machine is therefore increased while at the same time reducing the risk of damage to the root crops, which leads to improved economic efficiency in the use of the machine.

An electromagnetic image acquisition unit refers to image acquisition units used to produce images of the material transported on the transport element, which units contain sensors that detect electromagnetic waves, in particular optical waves. These sensors can be used to capture 1-dimensional or multi-dimensional images. For example, they may be one or more radar sensors that can receive waves reflected from the material, the frequency of which ranges from 10 to 150 GHz. An optical image acquisition unit is designed to capture light, in particular in the visible, ultraviolet, and/or infrared range.

Optical image acquisition units include 2D, 2.5D or 3D cameras such as RGB cameras, time-of-flight cameras, black-and-white or grayscale cameras, or stereo cameras. Light-section or structured light-based methods, plenoptic cameras etc., can also be used to image the crop. Acoustic image acquisition units can in particular take the form of arrays of distance-measuring sound sensors, in particular ultrasonic sensors, which are also suitable for generating imaging input data, i.e. the inspection image, for the evaluation device due to the continuous movement of the crop stream along the sensor array mounted on the machine frame. The same applies to array-like arrangements of optical distance sensors or array-like arrangements of mechanical touch sensors. RGB cameras often have two-dimensional image sensors in the form of CCD or CMOS sensors.

It goes without saying that both an electromagnetic and an acoustic image acquisition unit can be combined in a method according to the invention and an apparatus according to the invention, and an image acquisition unit can also have one or more electromagnetic and/or acoustic sensors.

Preferably, the feature is determined by the evaluation device on the basis of an input data set, generated by or formed by the inspection data set, by means of a neural-network-based, histogram-based, and/or structure-from-motion analysis. These analyses are particularly suitable for large amounts of data that arise when the crop stream is examined during a harvest run, in particular of a potato or beet digger.

In particular, in a refinement of the method according to the invention, the neural network is designed as a convolutional neural network, which classifies each input data set into one of a set of classes which represent the values of different screening capability features. This type of neural network has proved to be particularly successful for the identification of the soil aggregates and the screening capability features assigned during harvesting.

In particular, the evaluation device comprises one or more CPU units and/or one or more graphics processor units, in particular in the form of GPU—(Graphical Processing Unit) or GPGPU—(General Purpose Graphical Processing Unit) and/or FPGA-based (Field Programmable Gate Array) processor units. This implementation of the evaluation device makes it possible to evaluate the inspection data set in a particularly resource-saving manner, and in particular locally. It goes without saying that the evaluation device, which is designed as an EDP device or formed by such a device, has other common means, e.g. for power supply, interfaces, RAM and non-volatile program and data storage.

According to the invention, in particular under difficult harvesting conditions in which the collected soil or earth disintegrates into only a few large aggregates, a knocker in the form of a rotor knocker or vibrating knocker can be employed to improve the screening performance of the transport element, in particular a hedgehog band or screening band. This creates an additional oscillatory motion of the transport element and thus increases the screening performance, because the soil aggregates, for example in the form of plaques, are destroyed by the impacts. Additional or supplementary operating parameters of a transport element designed as a screening band are, in particular, a screening band speed, a collection screening band speed, an adjustable height of at least one triangular roller, an adjustable height of any drop stage present, a frequency of one or more knockers, an amplitude of, for example, a vibrating knocker, the position of a knocker or an actuator acting on the screening band in relation to the screening band, and/or the inner width of the screening band. The operating parameters of the screening band are thus the operating variables, such as speeds, frequencies, amplitudes or positions, that can be adjusted by any units acting on the screening band. An adjustment signal is then accordingly a signal that effects the adjustment of these variables, which is output or initiated by the evaluation device. The aforementioned adjustment devices are also available in some cases for conveyor elements implemented as hedgehog bands, in particular for adjusting the band speeds. In the case of transport elements in the form of roller arrangements, their rotation speeds or distances from each other can be adjusted.

The in particular camera-based analysis of the crop stream on the transport element, in particular a screening band, leads to the acquisition of features that make it possible to estimate the average aggregate size, so that on the basis of this information the knocker or any other means of influencing the screening performance of the screening band can be automatically activated or deactivated and its function adjusted as required. For example, a plurality of adjustment means arranged consecutively in relation to and in particular parallel to the transport direction of the screening conveyor can be variably adjusted.

Preferably, the image acquisition unit captures, in particular, at least a front third of the screening band. Depending on the position of the camera's viewing angle, it is advantageous to convert an optically distorted image of the section of interest into a rectangular representation.

In order to accurately detect crops particularly reliably, in particular independently of the ambient conditions, the screening band section under examination or the crops transported on it can be illuminated by means of a lighting unit.

Preferably, for the determination of the aggregate size of the earth or soil aggregates, for example the clod size, the evaluation device selects an in particular contiguous and preferably rectangular region of the inspection image or the inspection data set that contains at least 75%, preferably 90%, more preferably 95% and further preferably exclusively, earth or clods. Even though these regions may not appear in every image during harvesting, in particular at high driving speeds, it has been shown that an appropriately restricted region for the determination of the clod size produces particularly good results and that even small regions, in particular at least 15 cm×15 cm in size, are sufficiently representative for an adjustment or modification of any operating parameters.

In particular, such a region is selected automatically. In particular, this is accomplished by examining the color information contained in the inspection data set, the edges or gradients of any 2D or 3D images, and, if necessary, using statistical analyses. In particular, a pixel-by-pixel classification based on color information is used for this purpose.

In order to determine at least one clod size, the part of the inspection data set which forms this contiguous and preferably rectangular region, containing at least substantially earth, is provided directly or in processed form as an input data set into a neural-network-based, histogram-based and/or structure-from-motion analysis, in which the image region is assigned at least one clod size which is used for adjusting the operating parameter.

In particular for the use of neural networks, preferably convolutional neural networks (CNN), which contain convolutional layers, the input data set can be converted into vector form, for example. Topologically, CNNs can be sequential or recurrent networks. Convolutional layers are processing layers in the network that apply a convolution filter to an input matrix. As with other layers, the convolution filter also has degrees of freedom in the form of weights. The convolution filters are used to extract the image features, on the basis of which, for example, a classification is carried out. To make the application of CNNs to the invention practical, however, a number of improvements had to be made in its development. In order to reduce the memory requirements of the networks, using the assumption that image features are of equal interest regardless of their position in the image, split weights are used for the convolution filter neurons. The split weights are also robust against variance of translation, rotation, scaling and luminance. In addition, pooling layers can be used between the convolutional layers, which discard values in some ranges. Max-Pooling is preferably used, whereby all values in a small range (e.g. 2×2 or 4×4) are discarded except for the largest and hence most significant value.

In order to keep the calculation of the CNN as simple as possible, a rectified linear unit (ReLU) is preferably used as the activation function. This is always 0 in the negative range and linearly increasing in the positive range. With this enhancement, a CNN can perform particularly well for the live operation of a machine according to the invention. In addition, a computer architecture capable of parallel calculation is advantageous. The neurons within a layer can be calculated independently of one another and thus in parallel. Thus, an architecture with many parallel computing units, e.g. in the form of a GPU, is well suited for CNNs.

Preferably, the image section is chosen in such a way that it contains the maximum of an earth density distribution, i.e. the image section is automatically chosen in such a way that it has the maximum value of a corresponding density distribution comprising essentially clods or earth. Such a distribution is obtained in particular on the basis of a pixel-by-pixel classification in which all pixels of the image region under examination are classified with regard to the probability of their membership of object groups such as root crops, earth/clods, and, if applicable, stone and/or leaves. Another classification variable could also signify "empty screening band", i.e. the absence of any crops. Preferably, the region with the largest number of pixels representing earth is used for the selection of the image section. The maximum value of "earth density" is the optimum range that is made available as an input variable to the evaluation method, preferably based on neural networks, in particular a CNN, for acquiring the screening capability features. It is preferable not to use image sections with an earth or soil density of less than 75% for the determination of the features describing the screening capability, so that the determination of the at least one screening capability feature is not affected by too many foreign bodies, such as stones, leaves or even root crops which may be present. For example, the image section can also be automatically defined according to a lower threshold value of a minimum earth density.

It goes without saying that the neural network is trained in advance with a large number of inspection images or inspection data sets that are the same size as the matching image section. For similarly sized images, the edge regions of smaller images can be filled with zeros by so-called zero-padding. If the image size varies within a maximum range of 10-15%, this does not lead to significant deterioration of the image analysis result. For example, one of 5 size classes is manually assigned for a large number of inspection data sets.

In particular when using a CNN, one or more categories based on the size of the soil aggregates can be assigned to the image regions of the inspection image or the inspection data set. For example, on a scale from 1 to 5, each image can be assigned a corresponding value. During the training phase of the CNN, this screening capability value is specified by a human expert for a representative number of sample images from which the CNN can learn its internal weights. During the online prediction phase, this value automatically estimated by the CNN value is used for controlling or adjusting the operating parameter or parameters.

Against the background of the available technology, extensive experiments have shown for a wide range of harvesting conditions that it is advantageous to define, in particular, a rectangular input data set for the neural network with edge lengths between 100 and 400 pixels each, preferably between 150 and 250 pixels. Given the prevailing variances this size represents a very good compromise between computing power and duration required to implement the adjustment of the operating parameters during a continuous operation within less than 30 seconds, preferably less than 3 seconds, of acquiring an image.

Furthermore, when using this input image size it is possible to find sufficiently large image regions which are predominantly occupied exclusively by soil or soil aggregates in a sufficiently large proportion (greater than approximately 75%) of the camera images in machine operation. These image sizes must also be seen in relation to the resolution of the image sensors used, for example the camera, which is in particular within the range of 0.5 to 10 megapixels, preferably within 1.0 to 1.5 megapixels.

Preferably, the evaluation device evaluates the inspection data sets at least partly locally on the machine or on a directly connected towing vehicle. In particular, if large data banks are required to handle the large number of adjustable parameters, the evaluation device can also evaluate the inspection data sets at least partially, preferably even completely, on a wirelessly connected server, although this would require a correspondingly fast and stable data connection for the continuous operation.

Mixed forms of such evaluations are also conceivable, so that a part of the hardware used for the evaluation can be provided on the local machine and another part can be available at a remote location.

By means of any environmental sensors present, e.g. soil sensors, in particular by means of a moisture sensor, in a further exemplary embodiment of the invention the moisture level of the soil aggregates can be additionally determined and used in the evaluation device as an additional means for adjusting the operating parameter. A moisture sensor can operate either by electrical or optical means. A sensor for detecting the electrical conductivity can also provide further information on the condition of the soil, which can be used when adjusting the operating parameters of the screening conveyor.

In a further exemplary embodiment of the method according to the invention, the machine is equipped with a position sensor, for example a GNSS receiver, and has access to mapping material of the areas to be harvested, which is either stored directly on the machine or made available via a remote server with the aid of a mobile network connection. In this case, the local soil type stored in the mapping material in combination with the machine position can be an additional auxiliary variable for setting the operating parameters of the screening conveyor.

Also, in one implementation of the method, the machine can also be connected to a remote server from which it can also retrieve weather data, i.e. humidity and temperature information. This information can also be fed into the determination of the operating parameters of the screening conveyor.

Preferably, the determination of the operating parameter is part of a control loop of the machine, in which in particular the weather, i.e. humidity and temperatures, and/or the soil type and/or a clearing strategy are also used as input or reference parameters. In such a control loop, further input variables can be supplied that can be acquired at a higher frequency, typically one-dimensional ones such as fill levels of the conveyor elements or loading values of the drive elements, such as pressures, torques or current consumptions. These input variables can be used to control the operating parameters of the machine and in particular the screening conveyor at a high frequency. With such a control loop, the rooting depth and/or the driving speed can preferably also be controlled.

The reference parameters here, such as the weather, i.e. humidity and temperatures and/or the soil type and/or a clearing strategy, and in particular the feature or features determined according to the invention, are used for describing the screening capability of the soil in the manner of a cascade control for optimizing the parameters of the control loop, which then in particular has a cascaded design, and thus to compensate for interfering variables such as variations in the type of soil that cannot be detected based on the input variables of the higher-frequency control loop. Preferably, the cycle time of the higher-frequency control loop is in the range of 1 to 100 milliseconds, while the acquisition of the screening capability feature or features from the inspection data set runs with cycle times from 100 milliseconds to 30 seconds.

In particular, all input parameters that may be relevant for adjusting the operating parameter are linked to one another in a corresponding database, in particular in the form of a locally or externally maintained data bank, wherein the screening capability features and operating parameter values, and in particular environmental parameters, may additionally be related to each other empirically or, if appropriate, also analytically. The operating parameter in this case can also be adjusted under a wide variety of conditions by means of the database.

In one embodiment of the method according to the invention, the evaluation device implemented as an EDP device is configured in such a way that it records not only the calculation but also the image data and/or other sensor data and/or screening capability properties and/or other intermediate calculation results and/or operating parameters and/or environmental parameters, in particular linked to position information of the machine. This data can be stored locally on the evaluation device carried along by the machine, as well as transmitted to central servers via mobile connections. This data can be used to display the sifting behavior on the field being processed in the form of a map. In addition, in particular if this data is recorded by a plurality of machines and merged centrally, it can be used to improve the algorithmic logic for acquiring the screening capability features as well as any control logics for determining the operating parameters.

The object specified at the beginning is also achieved by a machine for harvesting and/or separating root crops comprising at least one electromagnetic, in particular optical, or acoustic image acquisition unit, a transport element, in particular in the form of a screening band, which can be moved relative to a machine frame of the machine, and an evaluation device as well as means for adjusting the or an additional transport element, the machine being suitable for carrying out the steps of the embodiments of the method according to the invention as described above and in the following. In particular, the means for adjusting the conveyor belt are means for adjusting a screening band as described above or in the following.

The object is also achieved by a computer program product which comprises commands which cause the machine according to the invention described above or below for harvesting root crops and/or separating root crops to carry out the method steps described above or below.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Individual technical features of the exemplary embodiments described below, in combination with the exemplary embodiments described above as well as the features of the independent claims and any additional claims, can also lead to subject matter according to the invention. Where appropriate, functionally equivalent elements are provided with identical reference numbers.

Figure 1:
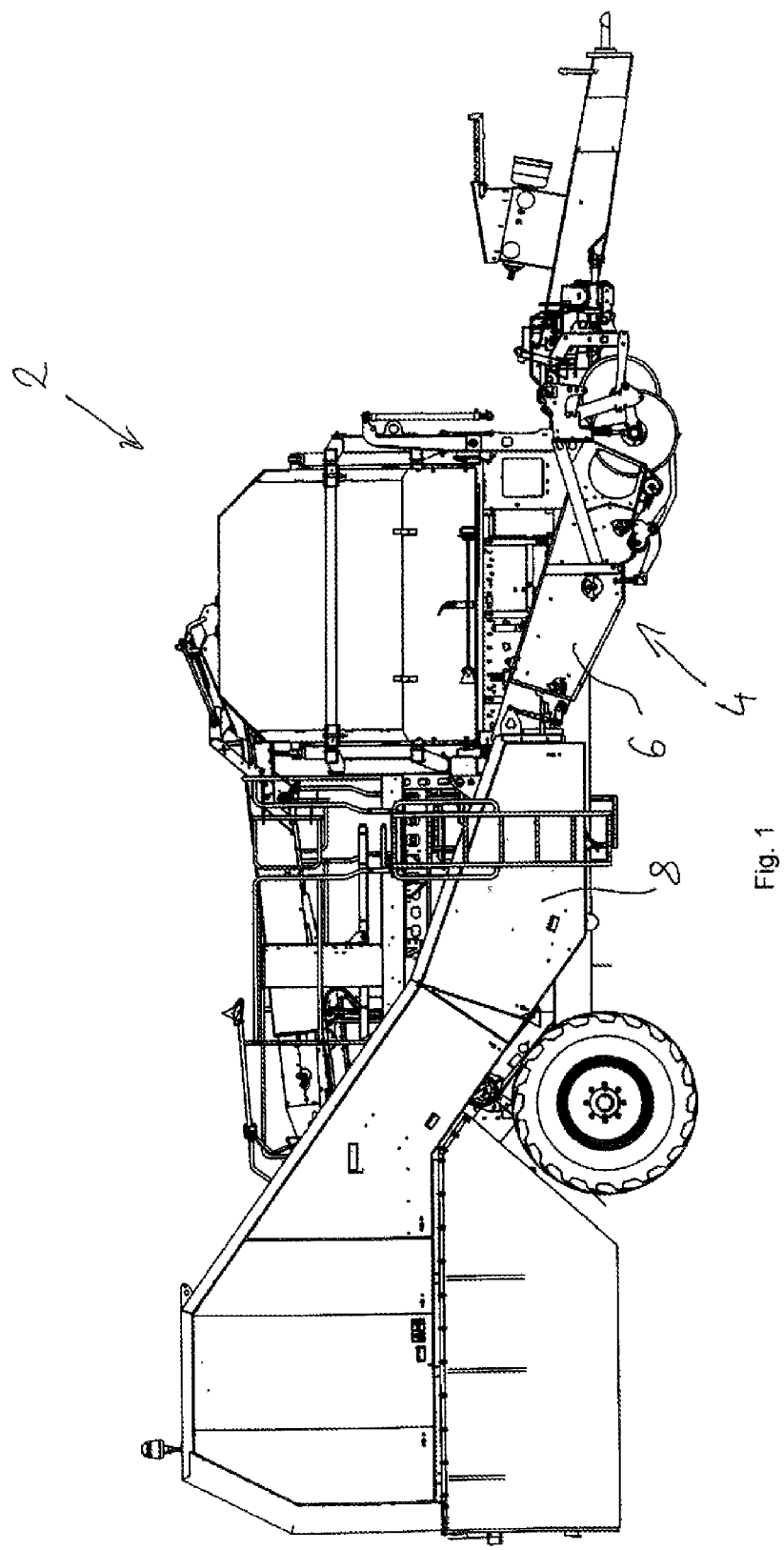
FIG. 1 shows a machine according to the invention in a side view.
Figure 2:
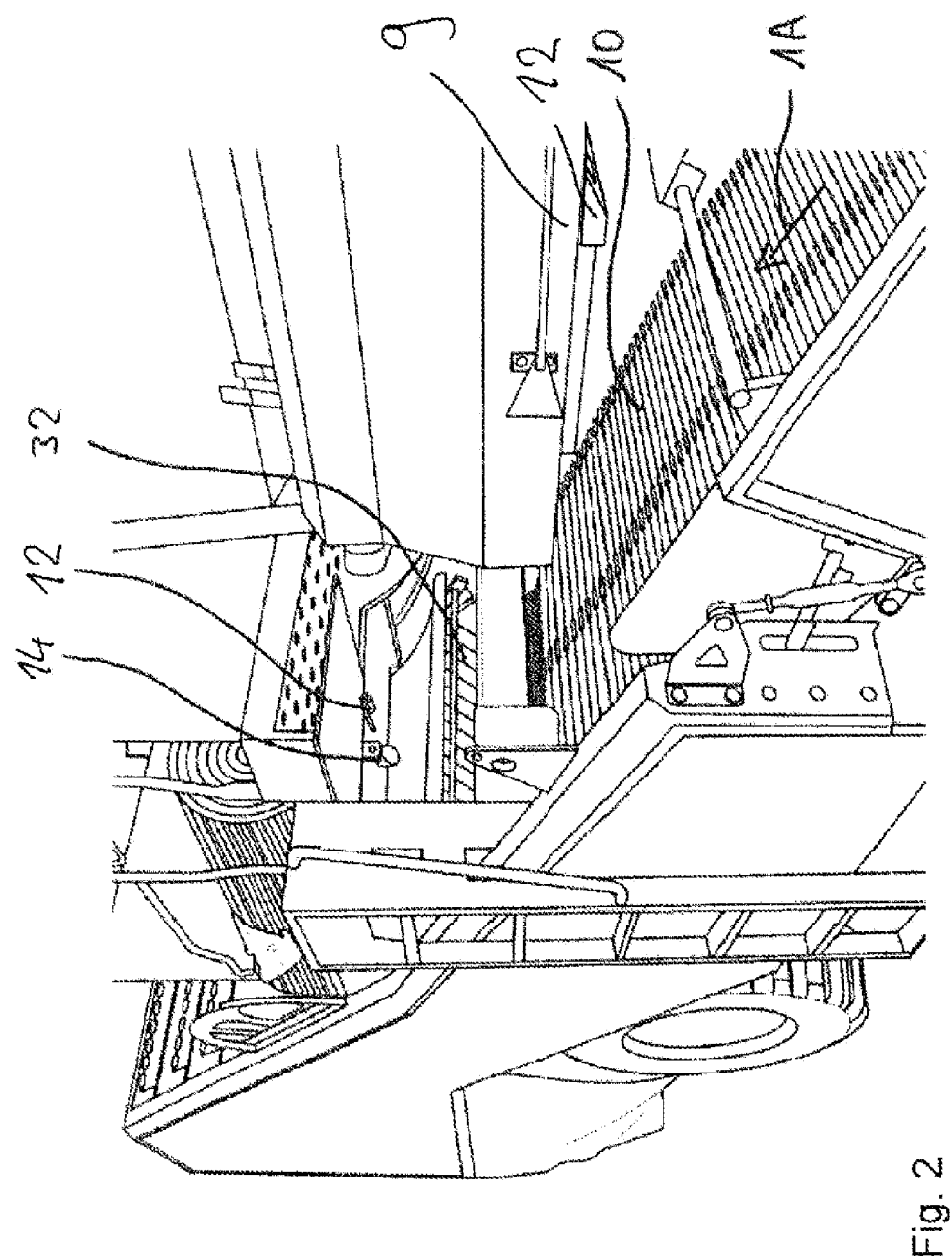
FIG. 2 shows a part of the object according to FIG. 1 in a perspective view.

A machine 2 is designed in the present case for harvesting root crops in the form of potatoes, and thus as a potato harvester. The material in the form of soil or soil aggregates, root crops, leaves and/or stones collected in the region of a receptacle 4 is transported in a conveying direction 1A via transport elements in the form of screening bands 10, mounted behind a machine frame 6 as well as other frame parts 8. A screening band 10 connects directly to the receptacle 4 (FIG. 2). The material transported in the direction 1A by means of the screening band 10 is captured by a first optical image acquisition unit 12 in the form of an RGB camera, which is fixed to a machine frame part 9 aligned at an angle to the screening band 10 in the direction of the receptacle 4. A lighting means 14 illuminates the screening band in the region of a second image acquisition unit 12, which is located behind the first image acquisition unit 12 in the conveying direction 1A.

Figure 3:
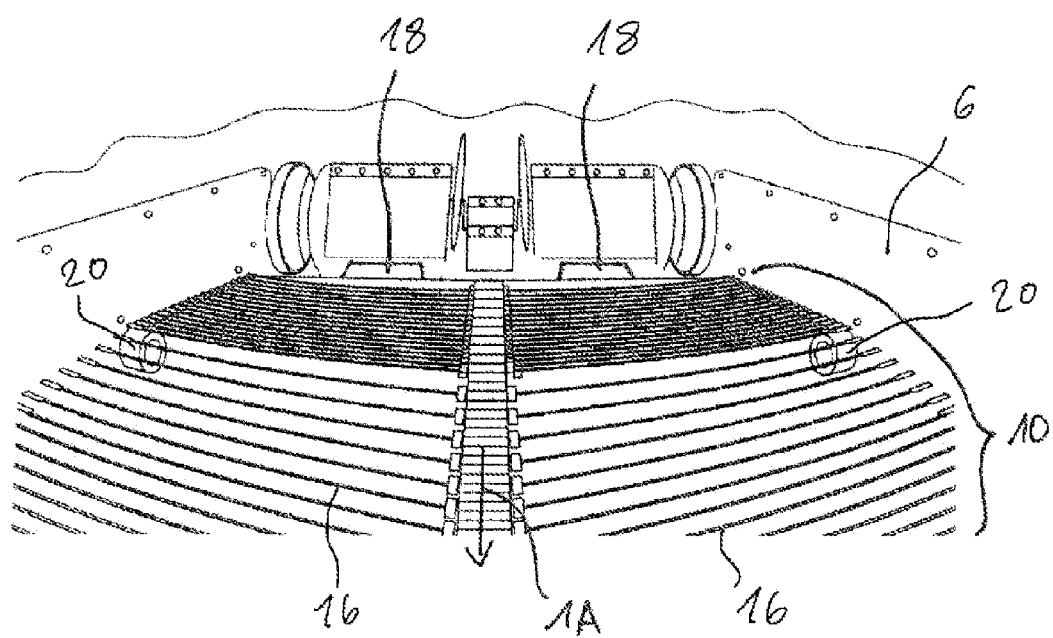
FIG. 3 shows the part of the object according to FIG. 1 that is acquired by an optical image acquisition unit.

The region of the machine 2 captured by the first image acquisition unit 12 arranged on the right in FIG. 2, is shown in FIG. 3, here not filled with earth. The individual screening bars 16 of the screening band 10, which is mounted directly downstream of the horizontal rooting blades 18 of the receptacle 4, are particularly visible. Below the screening band 10, adjustment means for adjusting operating parameters for the operation of the screening band 10 are provided on the machine frame 6. These can be the rollers 20 shown in FIG. 3, which can be part of additional adjustment devices, depending on the design of the machine 2 according to the invention. Using an evaluation device, an image section 22 is automatically selected (FIG. 4), in which as few root crops 24 as possible as well as additional materials 26 (here: leaves) are included. The image section 22 shown consists of at least 90% soil aggregates 28 and is already aligned at right angles, while the rest of the image is still slightly distorted in perspective.

The recognition of the leaves and the soil aggregates is carried out by means of a pixel-by-pixel classification, for example, using the color values acquired by the optical image acquisition unit 12 comprising values representing grayscale and/or actual colors. These are compared with reference values or reference value ranges. This form of differentiation enables a qualitative identification of the constituent on the inspection image and assigns a pixel to a class of (crop) material (earth/soil aggregates, leaves, root crop, stone), in particular within specifiable or specified threshold values.

Figure 4:
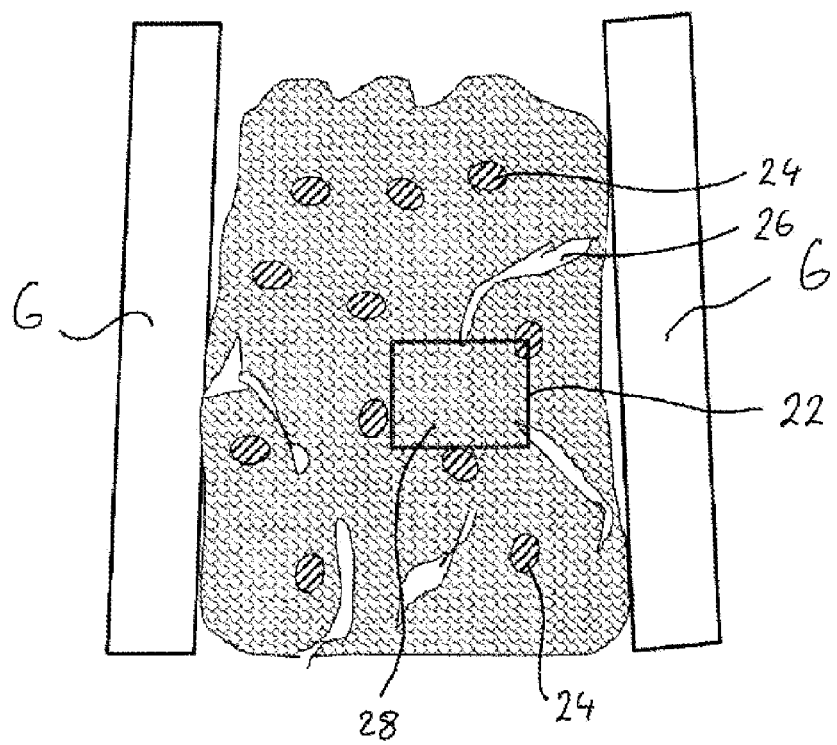
FIG. 4 shows the selection of a region of an inspection image.
Figure 5:
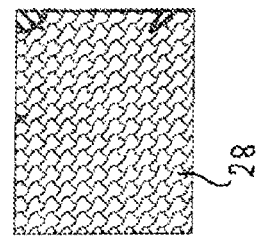
FIG. 5 shows the classification options of the region according to FIG. 4.
Figure 5:
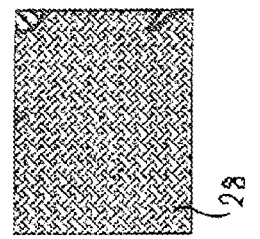
Figure 5:
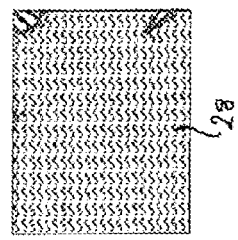
Figure 5:
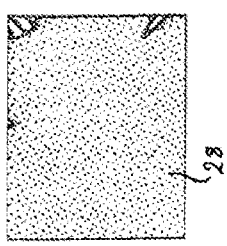
Figure 5:
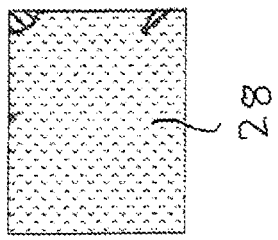

Once a region 22 has been identified, the inspection data set or portion of the inspection data set representing that region is fed to the neural network, if necessary in a format adapted to the input requirements of the network. The neural network, in particular a CNN, assigns the image region at least one soil aggregate size, and in another embodiment of the invention also components of different size distributions of screening band sections in the image. The extract in FIG. 4 shows a clod size with particularly large clods, as can be seen in FIG. 5 on the right of the picture. Moving to the left from this right-hand image portion, additional size classes of soil aggregates are shown, which are recognized by the neural network and with which the neural network was trained in advance.

Figure 6:
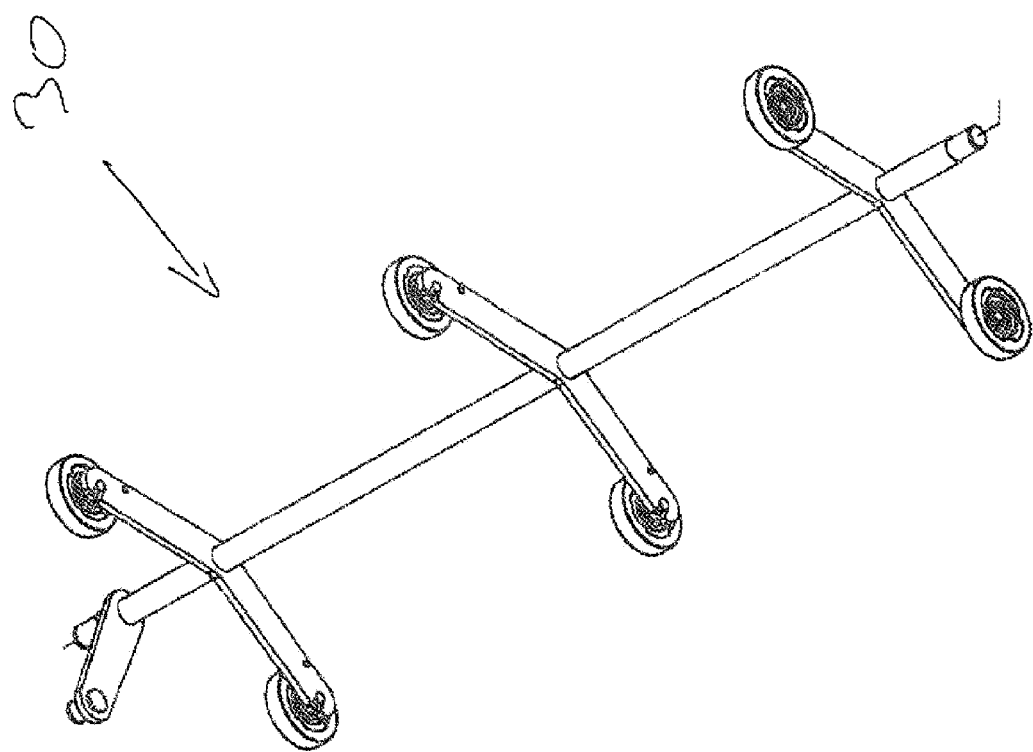
FIG. 6 shows a means of manipulating the screening band.
Figure 7:
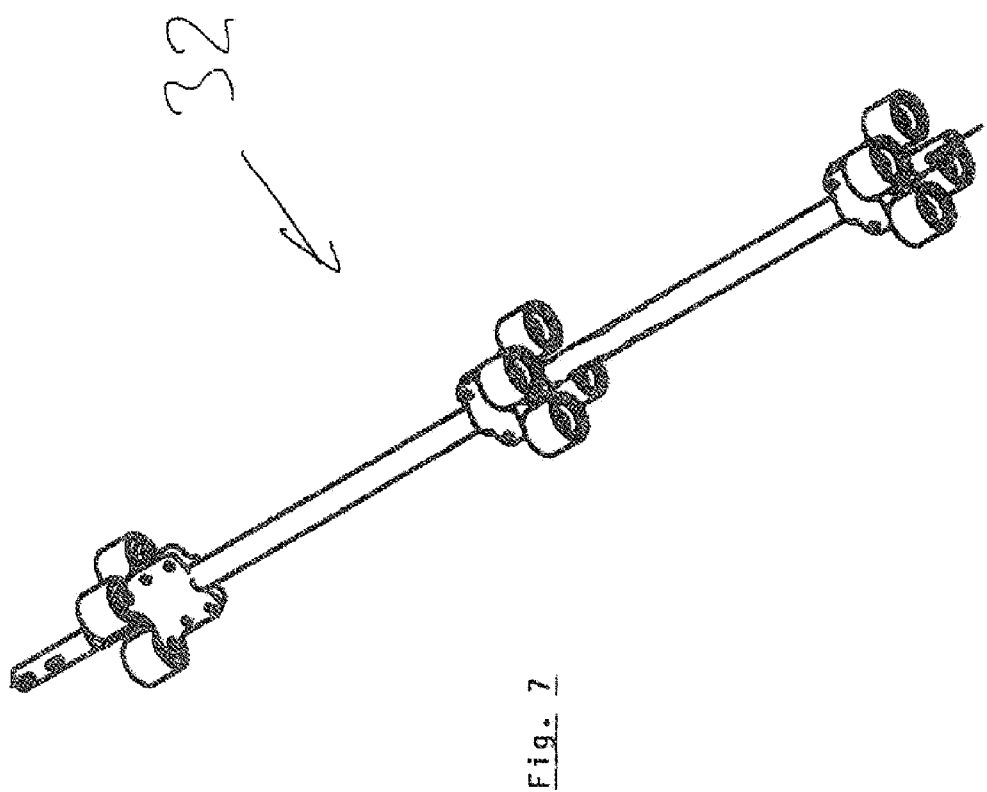
FIG. 7 shows a further means of manipulating the screening band.
Figure 8:
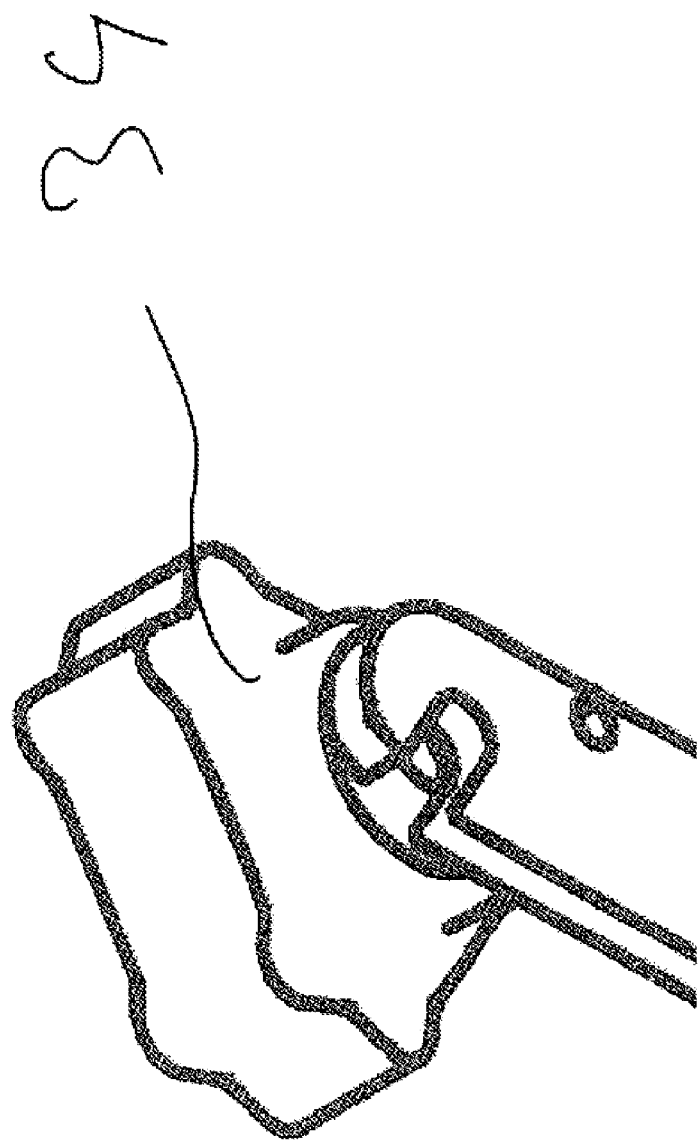
FIG. 8 shows a further means of manipulating the screening band.
Figure 9:
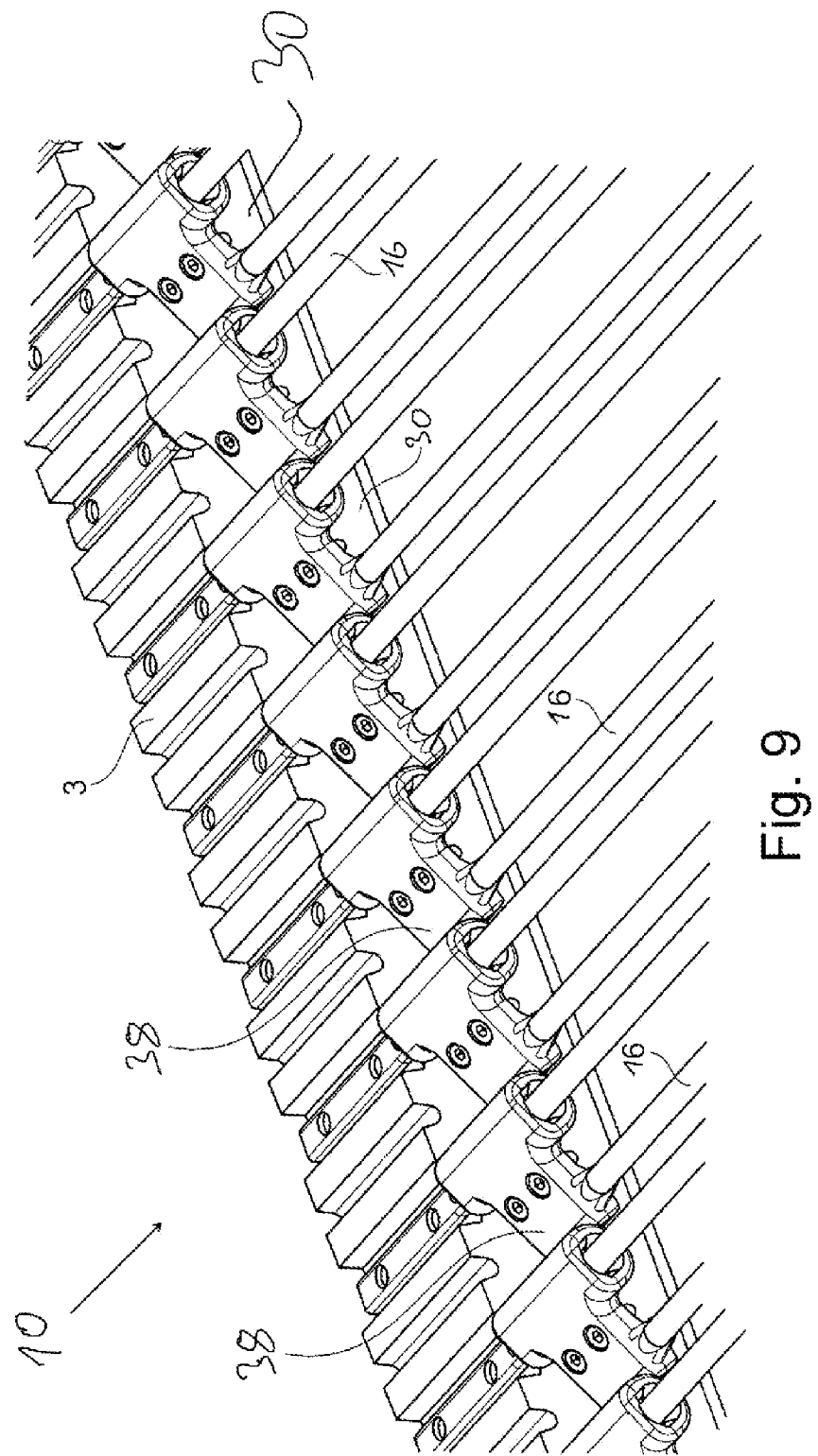
FIG. 9 shows a further means of manipulating the screening band.

Depending on the aggregate size defined in this way, an operating parameter, e.g. an amplitude of a deflection or a frequency of the movement of the vibrating knocker 30 shown in FIG. 6, can be varied. The vibration of this device transmits impulses to the screening band 10, which causes crushing of soil aggregates, in particular clods. Alternatively or in addition, a frequency of the rotor knocker 32 shown in FIG. 7 or a position of the triangular wheel 34 shown in FIG. 8 is varied in relation to the machine frame 6 supporting the screening band. An adjustment rail 30 (FIG. 9) can also be varied in terms of its distance to the belt 3 of the screening band 10, so that the screening bar units, each formed from two screening bars 16 connected by connectors 38, can be moved and thus the inner width of the opening between successive bars of successive screening bar units can be varied.

Figure 10:
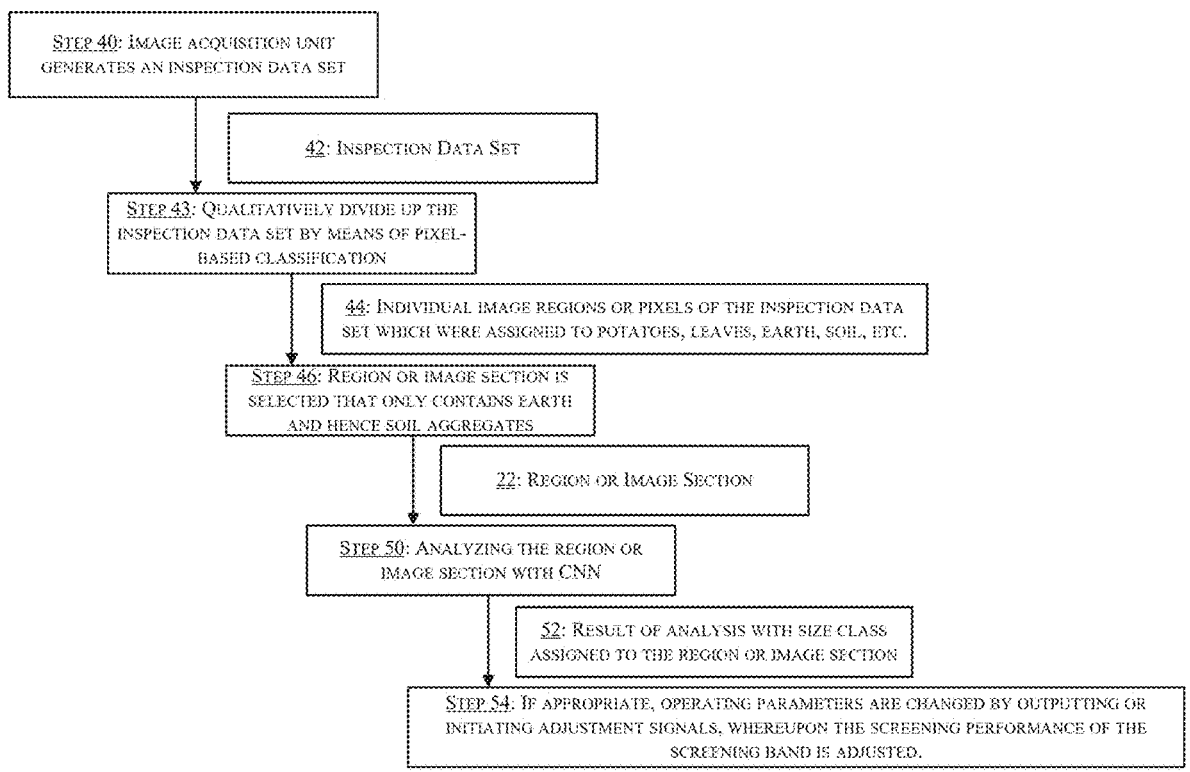
FIG. 10 shows a flow diagram of a method according to the invention.

A sequence of a method according to the invention shown in FIG. 10 begins with a first method step 40, in which an image acquisition unit 12 generates an inspection data set 42 which is then qualitatively divided up by means of pixel-based classification in step 43, so that individual image regions or pixels of the inspection data set can be assigned 44 to potatoes, leaves, earth or soil, etc. Then, in step 46, a region or image section 22 is selected that only contains earth and hence soil aggregates. This region 22 is analyzed in step 50 with a CNN, which in the result 52 assigns a size class according to FIG. 5 to the image section. Then, in step 54, if appropriate, the operating parameters are changed by outputting or initiating adjustment signals, whereupon the screening performance of the screening band 10 is adjusted.

Figure 11:
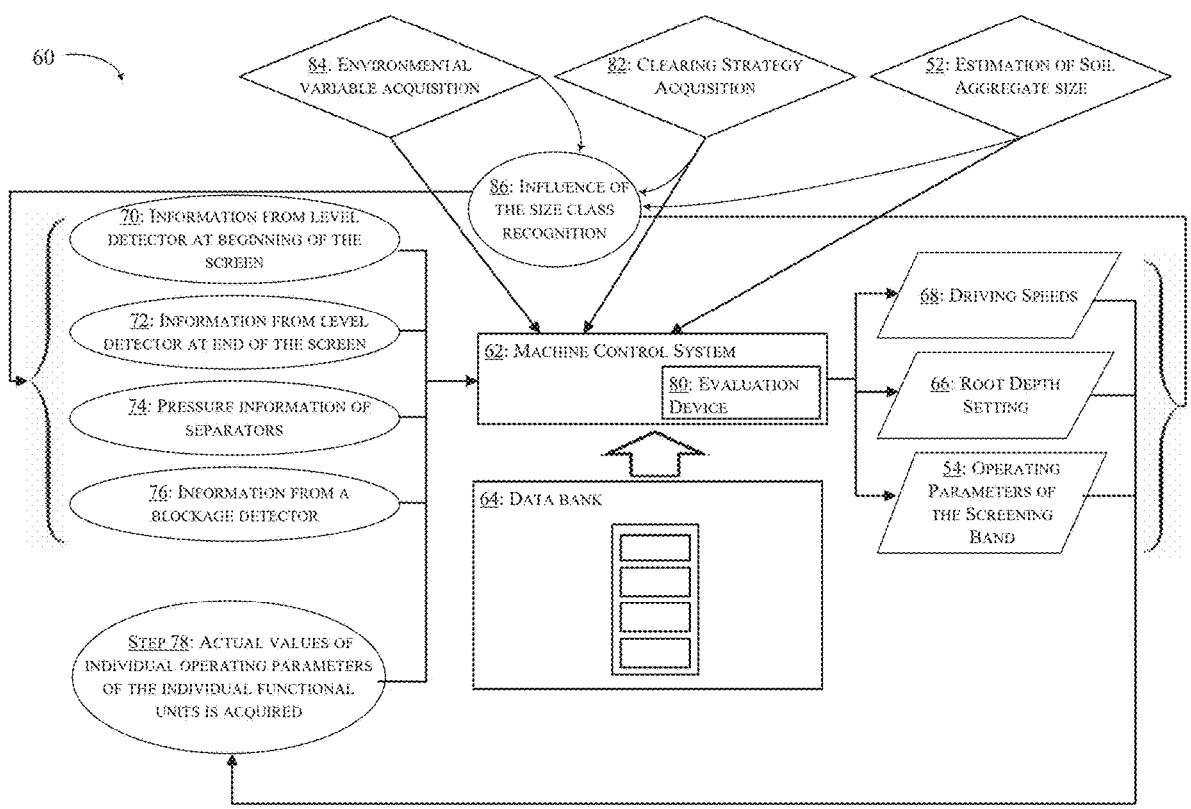
FIG. 11 shows a further diagram for a further method sequence according to the invention.

The adjustment of the screening performance of the screening band 10 and thus also the screening conveyor in accordance with step 54 is preferably part of a control loop 60 (FIG. 11), in which a machine control system 62 comprising the evaluation device accesses a locally or externally existing data bank 64 and receives assignment rules from it for adjustments of the operating parameters of the screening band according to step 54, rooting depth settings 66, and/or driving speeds 68. In the machine control system 62, a large amount of other information can also be processed. This includes information from a level detector 70 at the beginning of the screen and/or a level detector 72 at the end of the screening band and/or pressure information 74 of any separators and/or information from a blockage detector 76 of any separators. Finally, the actual values of the individual operating parameters of the individual functional units can be acquired in step 78 and processed as input information for the machine control system 62.

Typically, an evaluation device 80 is part of the machine control system 62. Additional input information for the machine control system 62 includes, in addition to the estimation 52 of the soil aggregate size, clearing strategies 82 and/or environmental information about weather and soil type, which can be specified by the operating personnel and which come from an acquisition device 84. A circle 86 symbolizes the influence of the size class recognition 52 carried out by the evaluation device, the clearing strategy acquisition 82 and the environmental variable acquisition 84 on the clearing performance of the machine 2 represented by steps 70 to 78. For example, in a clearing strategy that focuses on maximum yield, on detection of a maximum aggregate size class the amplitude of the vibrating knocker, the screening bar spacing, and the band speed can be maximized, while in a less aggressive strategy the amplitude can be applied to a lesser degree and the band speed reduced at the same time.

The invention claimed is:

1. A method for operating a machine for harvesting root crops and/or for separating root crops from further additionally conveyed material that includes at least soil in the form of loose earth and/or soil aggregates, the method comprising the steps of:
    capturing, by means of at least one electromagnetic or acoustic image acquisition unit, an inspection image of at least one portion of the material moved relative to a machine frame of the machine by a transport element,
    generating, on the basis of at least one inspection data set generated using the inspection image and/or formed by the inspection image, via an evaluation device, an adjustment signal for adjusting at least one operating parameter of the transport element and/or a further transport element of the machine,
    determining at least one feature for describing a capability of the additionally conveyed soil to be screened by the evaluation device and
    using the at least one feature for adjusting the at least one operating parameter.

2. The method as claimed in claim 1, wherein the at least one feature comprises one or more values which describe the size, shape, strength, or color of one or more soil aggregates and/or one or more distributions of the size, shape, strength or color of a plurality of soil aggregates.

3. The method as claimed in claim 1 wherein the at least one feature is determined by the evaluation device on the basis of an input data set, generated by or formed by the inspection data set, by a neural-network-based, histogram-based and/or structure-from-motion analysis.

4. The method as claimed in claim 3, wherein the neural network is a convolutional neural network, which classifies each input data set into one of a number of classes which represent values of different screening capability features.

5. The method as claimed in claim 3, wherein for the determination of the at least one feature by the evaluation device, a region of the inspection image or of the inspection data set is selected that contains at least 75 soil aggregates.

6. The method as claimed in claim 5, wherein a part of the inspection data set representing the region is provided directly or in processed form as an input data set into the neural-network-based, histogram-based and/or structure-from-motion analysis, in which the region is assigned the at least one feature which is used for adjusting the at least one operating parameter.

7. The method as claimed in claim 1, wherein by means of a classification method, constituents of the material present in the inspection image are determined.

8. The method as claimed in claim 1, wherein the evaluation device at least partly evaluates the at least one inspection data set locally on the machine or on a directly connected towing vehicle.

9. The method as claimed in claim 1, wherein the evaluation device evaluates the at least one inspection data set on a wirelessly connected server.

10. The method as claimed in claim 1, wherein the at least one operating parameter of the transport element, formed as a screening band, is a screening band speed, a collection screening band speed, an adjustable height of at least one triangular roller, an adjustable height of a drop stage, a frequency of a knocker, an amplitude of a knocker, the position of a knocker, and/or the inner width of the screening band.

11. The method as claimed in claim 1, wherein a moisture content of the soil aggregates is determined by a moisture sensor and used in the evaluation device for adjusting the at least one operating parameter.

12. The method as claimed in claim 1, wherein the determination of the at least one operating parameter is part of a control loop of the machine.

13. The method as claimed in claim 12, wherein a rooting depth and/or a driving speed are additionally controlled with the control loop.

14. The method as claimed in claim 1, wherein the at least one operating parameter is adjusted by a database in which features and operating parameters are stored such that they are linked to each other.

15. A machine for harvesting root crops and/or for separating root crops, the machine comprising:
   at least one electromagnetic or acoustic image acquisition unit,
   a transport element, selectively moveable relative to a machine frame of the machine, and
   an evaluation device as well as means for adjusting the transport element or an additional transport element, wherein the machine carries out the steps of the method as claimed in claim 1.

16. A non-transitory computer-readable recording medium with instructions stored thereon, that when executed by a processor, cause a machine for harvesting root crops and/or for separating root crops to execute the following steps:
   capturing, by means of at least one electromagnetic or acoustic image acquisition unit, an inspection image of at least one portion of material moved relative to a frame of the machine by a transport element,
   generating, on the basis of at least one inspection data set generated using the inspection image and/or formed by this image, via an evaluation device, an adjustment signal for adjusting at least one operating parameter of the transport element and/or a further transport element of the machine,
   determining at least one feature for describing a capability of additionally conveyed soil to be screened by the evaluation device, and
   using the at least one feature for adjusting the at least one operating parameter.

* * * * *